US006978034B2

(12) United States Patent
Lazzeroni et al.

(10) Patent No.: US 6,978,034 B2
(45) Date of Patent: Dec. 20, 2005

(54) HELMET HEADSET MOUNTING ASSEMBLY AND METHOD

(76) Inventors: John J. Lazzeroni, 1415 S. Cherry Ave., Tucson, AZ (US) 85713; Melinda K. Carevich, 1415 S. Cherry Ave., Tucson, AZ (US) 85713

( * ) Notice: Subject to any disclaimer, the term of this patent is extended or adjusted under 35 U.S.C. 154(b) by 154 days.

(21) Appl. No.: 10/208,898

(22) Filed: Jul. 30, 2002

(65) Prior Publication Data

US 2002/0176595 A1 Nov. 28, 2002

Related U.S. Application Data

(63) Continuation-in-part of application No. 09/441,392, filed on Nov. 16, 1999, now abandoned.

(51) Int. Cl.[7] .................... H04R 25/00

(52) U.S. Cl. .................. 381/384; 381/374; 455/575.2; 379/430

(58) Field of Search .................. 381/361, 362, 381/376, 374, 367, 384, 375, 334, 370; 379/430; 2/421, 422, 425, 905; 174/58; 455/575.1, 455/575.2, 90.1, 90.2, 350

(56) References Cited

U.S. PATENT DOCUMENTS

| | | | | |
|---|---|---|---|---|
| 1,085,916 A | | 2/1914 | Hutchison | |
| 2,904,645 A | | 9/1959 | Sarles | 179/171 |
| 3,180,333 A | * | 4/1965 | Lewis | 128/201.19 |
| 3,249,873 A | | 5/1966 | Whittemore, Jr. et al. | 325/361 |
| 3,258,534 A | | 6/1966 | Goldsworthy | 179/1 |
| 3,586,977 A | | 6/1971 | Lustig et al. | 325/16 |
| 3,889,190 A | | 6/1975 | Palmer | 325/16 |
| 3,906,547 A | | 9/1975 | Aileo | 2/6 |
| 3,908,168 A | | 9/1975 | McMahon | 325/1 |
| 3,916,312 A | | 10/1975 | Campbell | 325/16 |
| 4,152,553 A | | 5/1979 | White | 179/156 R |
| 4,607,395 A | | 8/1986 | Sundahl | 455/351 |
| 5,022,100 A | | 6/1991 | Belanger | 2/422 |
| 5,119,505 A | | 6/1992 | Tisseront et al. | 455/89 |
| RE34,525 E | | 2/1994 | Lazzaroni et al. | 2/422 |
| 5,317,643 A | | 5/1994 | Patricelli | 381/187 |
| 5,404,577 A | | 4/1995 | Zuckerman et al. | 455/66 |
| 5,410,746 A | | 4/1995 | Gelber | 455/344 |
| 5,590,209 A | | 12/1996 | Pratt et al. | 381/168 |
| 5,615,410 A | | 3/1997 | DeMars | 455/90 |
| 5,678,205 A | | 10/1997 | Gray | 455/90 |
| 6,075,857 A | * | 6/2000 | Doss et al. | 379/430 |
| 6,430,298 B1 | * | 8/2002 | Kettl et al. | 381/361 |

* cited by examiner

FOREIGN PATENT DOCUMENTS

| | | |
|---|---|---|
| DE | 2921434 | 5/1979 |

*Primary Examiner*—Huyen Le
*Assistant Examiner*—Tuan Duc Nguyen
(74) *Attorney, Agent, or Firm*—Quarles & Brady Streich Lang LLP

(57) ABSTRACT

A clampless mounting assembly for use with a helmet for attaching an internal headset to one of a plurality of different types of external electronic audio communications devices. External audio communications devices communicate with an internal headset by way of electrical conductors inherent in a mounting post. The mounting post is inserted through a hole in the helmet. The mounting post comprises a base on one end and a retainer on the other end to secure the headset to the helmet, eliminating the need for clamps or adhesives. The electrical conductors may be used in a variety of configurations for connecting the headset to one of a plurality of different types of audio communications devices. An external cable, connected to an external audio communications device, is inserted into an external connector inherent in the mounting post.

30 Claims, 4 Drawing Sheets

HELMET HEADSET MOUNTING ASSEMBLY AND METHOD

RELATED APPLICATION INFORMATION

This is a continuation-in-part of Ser. No. 09/441,392, filed Nov. 16, 1999, now abandoned, which is incorporated by reference in its entirety for any purpose.

FIELD OF THE INVENTION

This invention is related in general to the field of helmet communications systems for use with audio systems such as citizen's band ("CB") radios, stereos, intercoms, tape and compact disk ("CD") players, and the like. Examples of such audio accessories include speakers, microphones, and the like. In particular, the invention consists of a novel mounting assembly for securing electronic communications components to helmets.

BACKGROUND OF THE INVENTION

Helmets are widely used to enhance the safety of persons riding vehicles such as motorcycles, all terrain vehicles ("ATVs"), and snowmobiles. It is desirable for a wearer of a helmet to be able to communicate with other individuals, be able to listen to radio, tape, CB, MP3, music, GPS audio commands, CD player, or other types of audio signals. It is also desirable for a wearer of a helmet to talk to other individuals. This is accomplished by placing audio accessories such as speakers and microphones on or inside the helmet, in close proximity to the wearers mouth and ears. This allows a wearer to listen and speak without interfering with the operation of the vehicle. The combination of microphone assembly and speakers is referred to as a helmet headset.

A means for attaching a headset to a helmet is desirable. Additionally, a means for physically supporting a headset so that microphones and speakers are positioned in optimal locations for use by the wearer is desirable. This is usually accomplished by placing a clamp or other mounting assembly on the helmet. Wires are generally used to attach the microphones and speakers to an electrical connector on or near the mounting assembly. Additionally, the mounting assembly may be used to support a microphone assembly. The mounting assembly also typically possesses an electrical connector for attaching the mounting assembly to external communications devices, such as a CD, CB, radio, etc. This provides an electrical connection from external communications devices to the mounting assembly and, by extension, to the audio accessories or headset.

Audio mounting assemblies for attaching audio headsets to helmets are known and have been the subject of numerous U.S. patents. Lazzeroni, et. al. U.S. Pat. No. Re. 34,525 discloses a headset mount design that uses a clamp to securely attach audio accessories to a location near the bottom edge of a helmet. Pratt U.S. Pat. No. 5,590,209 discloses a mount that is fastened to the outer side of the helmet using a layer of adhesive material. These methods of attaching audio accessories require that electrical wires run over an edge the helmet. This exposes the wires to the possibility of becoming snagged and damaged.

One patent which discloses a clampless helmet mounting system is Lewis et al. U.S. Pat. No. 3,180,333 entitled GAS MASK COMMUNICATION SYSTEM. Lewis discloses a gas mask with a threaded mounting post and electrical connection pass through. The pass through electrical connection is a bayonet connector which allows an external microphone to be removably mounted.

A second patent of interest is Belanger U.S. Pat. No. 5,022,100, entitled APPARATUS AND METHOD FOR UDNERWATER ACOUSTIC RECEIVING SYSTEM INSTALLATION IN DIVING HELMET. Belanger discloses a hole extending from a diving helmet with a waterproof connector mounted in and positioned partially through said hole and a female plug-receptacle fixedly mounted in a portion of said connector and having at least two contacts for electrical interconnection with a male plug from an acoustic receiving system.

It has become increasingly common for a wearer of a helmet to connect a helmet headset to more than one type or brand of audio system. For example, a wearer of a helmet may wish to connect the headset to an audio/communications system on a Harley Davidson Touring motorcycle and alternatively use the same helmet with the audio system on a Honda Gold Wing along with a CB/FRS communications device on an ATV. This requires that the helmet headset be able to be properly connected to various types of audio or communications devices.

Therefore it is desirable to have a mounting assembly that can be electrically connected to a plurality of different types of audio communications devices.

It is also desirable to have a mounting assembly that can be electrically connected to a plurality of different audio accessories.

It is likewise desirable to have a mounting assembly that can provide physical support for boom microphones.

It is desirable to have a mounting assembly wherein electrical pathways pass through a helmet, allowing electrical communications devices external to a helmet to be electrically connected to audio accessories internal to the same helmet.

It is further desirable to have a mounting assembly which will allow a plurality of different types of audio communications devices to be electrically connected to and function with a plurality of different types of audio accessories.

BRIEF SUMMARY OF THE INVENTION

The clampless headset mounting assembly according to this invention comprises a mounting post which is inserted through a hole in a helmet. The mounting post extends through the hole in the helmet and has both an internal end and an external end. The mounting post possesses multiple electrical conductors which run through the mounting post, electrically connecting an internal connector to an external connector.

The external connector is used to electrically attach the electrical connector to wires or cable assemblies which are, in turn, connected to audio communications devices residing on an associated vehicle. Additionally, the external connector provides a physical connection between the mounting post and the external wires or cable assemblies.

The internal connector is used to electrically connect the electrical conductors to wires which are, in turn, connected to a microphone assembly and speakers. A base on the interior end of the mounting post assists in supporting the mounting post inside the helmet. A retainer is used on the external end of the mounting post to secure the mounting post to the outside of the helmet. The combination of internal base and external retainer secure the mounting post to the helmet. The base can also be used to support elements of the headset, such as the microphone assembly.

So that a plurality of different types of headsets may be used with the mounting assembly, the internal connector is comprised of numerous individual electrical connectors which may be used in a plurality of combinations. The audio system that the type of headset is used with will determine which of various hookup cord assemblies will be used to connect the helmet headset to the audio system.

Likewise, in order to use the mounting assembly with a plurality of different types of audio communications devices and their associated cables or wire harnesses, the external connector is comprised of numerous individual electrical connectors which may be used in a plurality of combinations. The type of audio communications device and its associated cable or wire harness will determine which of the individual electrical connectors comprising the external electrical connection is used.

Since only some of the individual electrical connectors comprising the internal connector may be used at any given time and likewise for the individual electrical connectors comprising the external connector, the multiple electrical conductors which travel through the mounting post may also be used in a plurality of different combinations. This allows numerous types of headset to be electrically connected to numerous types of audio communications devices.

Therefore, it is a principal object of this invention to provide a means for passing multiple electrical conductors through a helmet.

It is another object of this invention to provide a means for passing multiple electrical conductors through a helmet without using flexing wires.

It is still another object of this invention to provide a means for electrically connecting an internal headset to one of a variety of external audio communications devices.

It is another object of this invention to provide a means for supporting members of a headset so that they are positioned according to the desire of the wearer of the helmet.

It is yet another object of this invention to minimize the size of an interior portion of a means for supporting members of a headset to reduce the potential for injury.

The present invention meets the aforementioned needs by securing a headset assembly to a helmet, supporting the headset microphone assembly, and electrically connecting the headset to one of a plurality of different types of external communications devices and its associated cable assembly. Various other purposes and advantages of the invention will become clear from its description in the specification that follows and from the novel features particularly pointed out in the appended claims.

The foregoing and other objectives, features, and advantages of the invention will be more readily understood upon consideration of the following detailed description of the invention, taken in conjunction with the accompanying drawings.

DETAILED DESCRIPTION OF THE INVENTION

Figure 1:
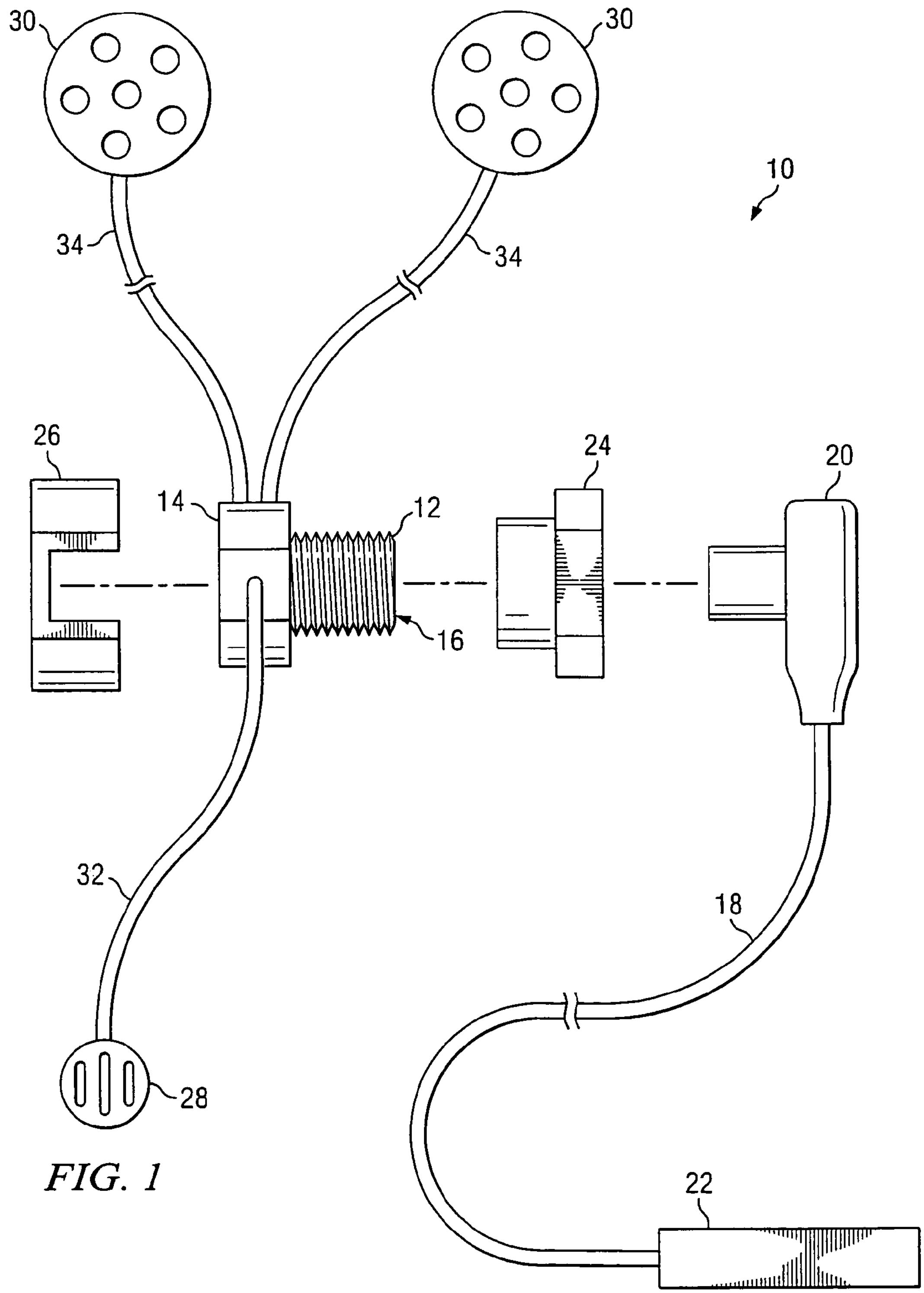
FIG. 1 is an exploded view illustrating the main components of a Clampless Headset Mounting Assembly according to the invention.

A clampless helmet mounting assembly 10 is shown in FIG. 1. A mounting post 12 contains multiple alternative electrical pass-through conductors or wires which run from one end of the post to an opposite end of the post. In the preferred embodiment of the invention, one end of the post 12 is formed into a base 14 which is used to support the post inside an helmet. The other end of the post forms a multiple-conductor connector 16. This connector 16 is used to electrically couple the multiple electrical pass-through conductors of the post to a wire harness or cable 18. The wire harness 18 can be used to connect the helmet headset to an audio communication device. Alternatively, the wire harness 18 can be used as an adapter cable to connect the helmet headset to yet another cable which is, in turn, connected to an audio communication device. The connector 16 also provides physical support for a connector 20 inherent in the cable 18. The cable 18 is used to provide an electrical connection between the helmet mounting assembly 10 and one or more external electrical communications devices 22 such as a radio, Cd player, tape player, or wireless telephone. In the preferred use of the invention, these external electrical devices reside on a vehicle such as a motorcycle, bicycle, ATV, or snowmobile.

The mounting post is inserted into an aperture 13 (see FIG. 5A) which has been created in a helmet. A retainer 24 is used to engage the mounting post 12 and attach the mounting assembly to an exterior side of the helmet. The combination of the base 14 and the retainer 24, along with the mounting post 12 itself, secure the mounting assembly to the helmet. Numerous methods could be used to secure the mounting post to the helmet, such as a clip assembly or jagged retaining posts, etc. In the preferred embodiment of the invention, a threaded post and a threaded retainer are used. The retainer 24 could be designed to completely encapsulate the mounting post threads. This would protect the threads from being damaged by contact with sides of the hole passing through the helmet. An optional protective cover 26 is used to provide a cushion between the mounting assembly 10 and the cheek or head or a wearer of the helmet. In the preferred embodiment of the invention, the mounting post 12 comprises external threads and the retainer 24 comprises internal threads for engaging the external threads of the post.

The multiple electrical conductors passing through the post 12 are connected to one or more transducers such as a microphone 28 or one or more speakers 30. In the preferred embodiment of the invention, a boom microphone assembly 32 is attached to and supported by the base 14. An alternate embodiment of the invention may possess a microphone attached to the interior front surface of a full coverage style helmet, eliminating the need for the base 14 to support a boom. Electrical conductors or wires electrically connect the microphone 28 to the conductors passing through the post. The microphone assembly 32 may be comprised of a microphone 28, electrical wires, and a boom. A boom, if used, allows the wearer of the helmet to position the microphone 28 in a position which is comfortable and effective for converting his/her speech into electrical signals. These signals are passed through the microphone assembly 32, through the base 14, through the post 16, and through the cable 18 to an external electrical communications device 22.

Electrical signals originating from an external electrical communications device 22 are passed through the cable 18, through the post 12, through the base 14, and through wires 34 to one or more speakers 30. The speakers 30 convert the electrical signals into acoustical energy.

Figure 2:
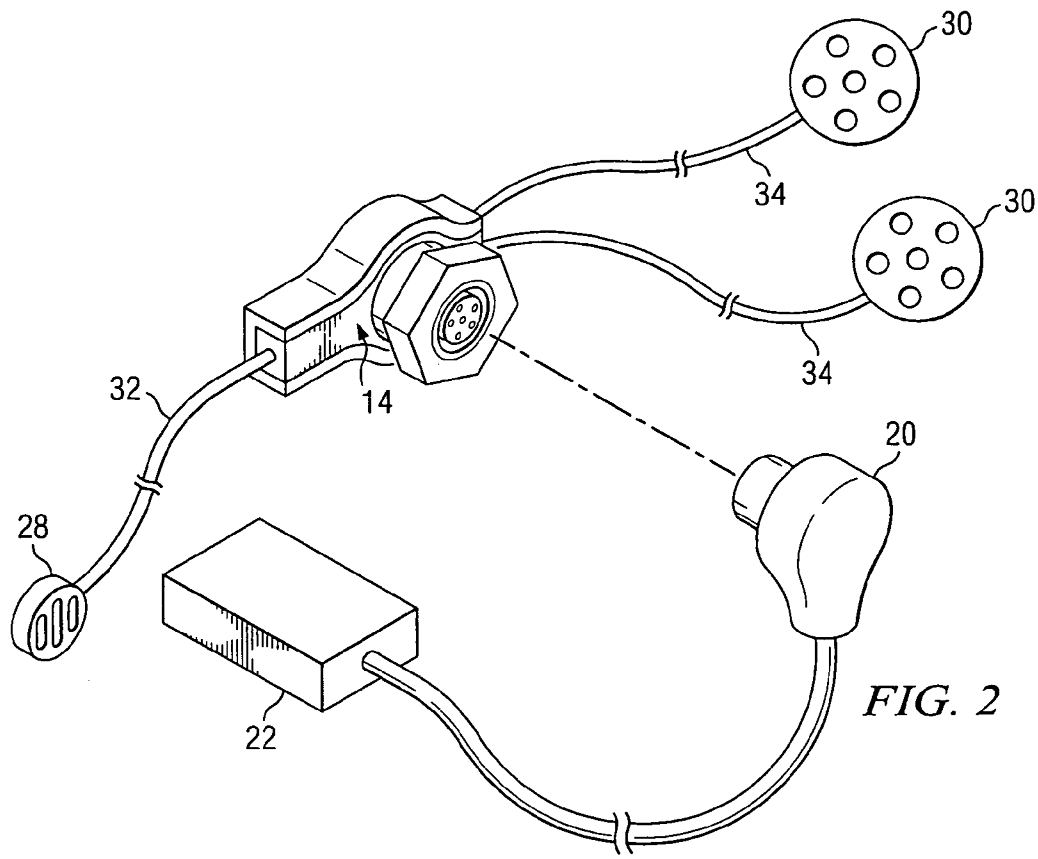
FIG. 2 is a side view of the clampless headset mounting assembly of FIG. 1 illustrating electrical connectivity according to the invention.
Figure 3:
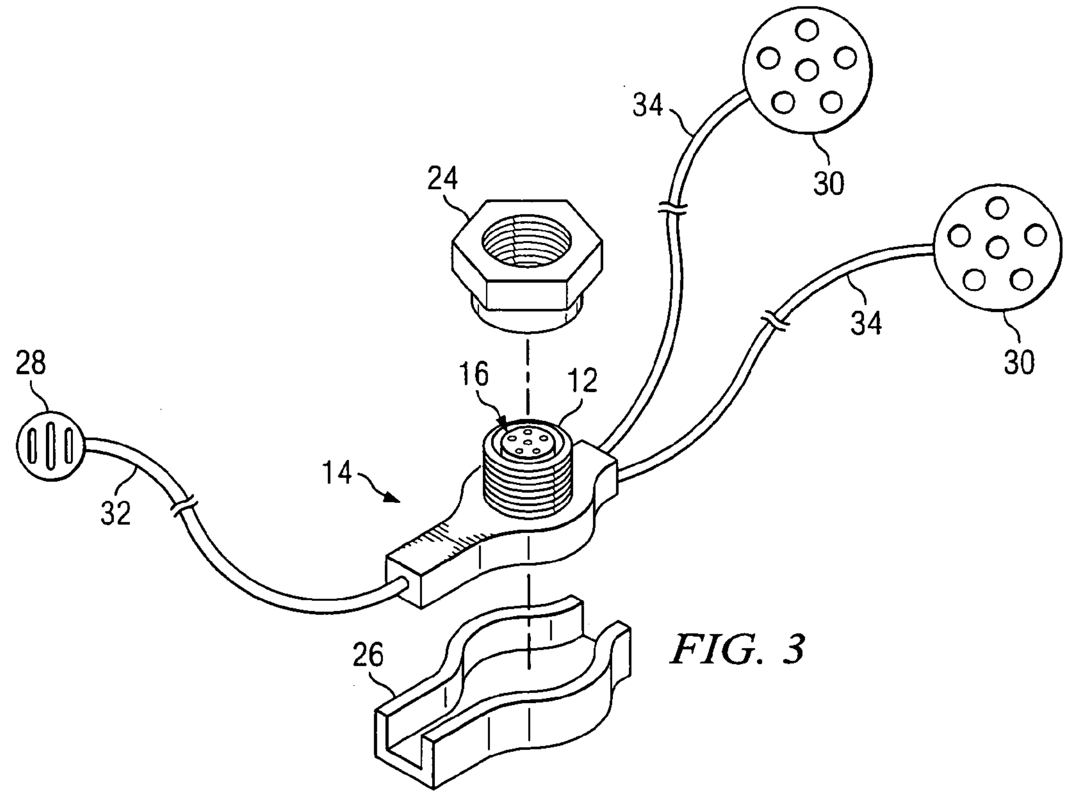
FIG. 3 is an exploded view of the electronics housing, threaded retainer, cheek cushion, microphone wire, and speaker wires of the clampless headset mounting assembly of FIG. 1 according to the preferred embodiment of the invention.

A side view of the clampless helmet mounting assembly 10 is shown in FIG. 2. FIG. 3 is an exploded view of the base 14, threaded post 12, threaded retainer 24, cheek cushion 26, microphone assembly 32, speaker wires 34, connector 16, and speakers 30 of the clampless headset mounting 10.

Figure 4:
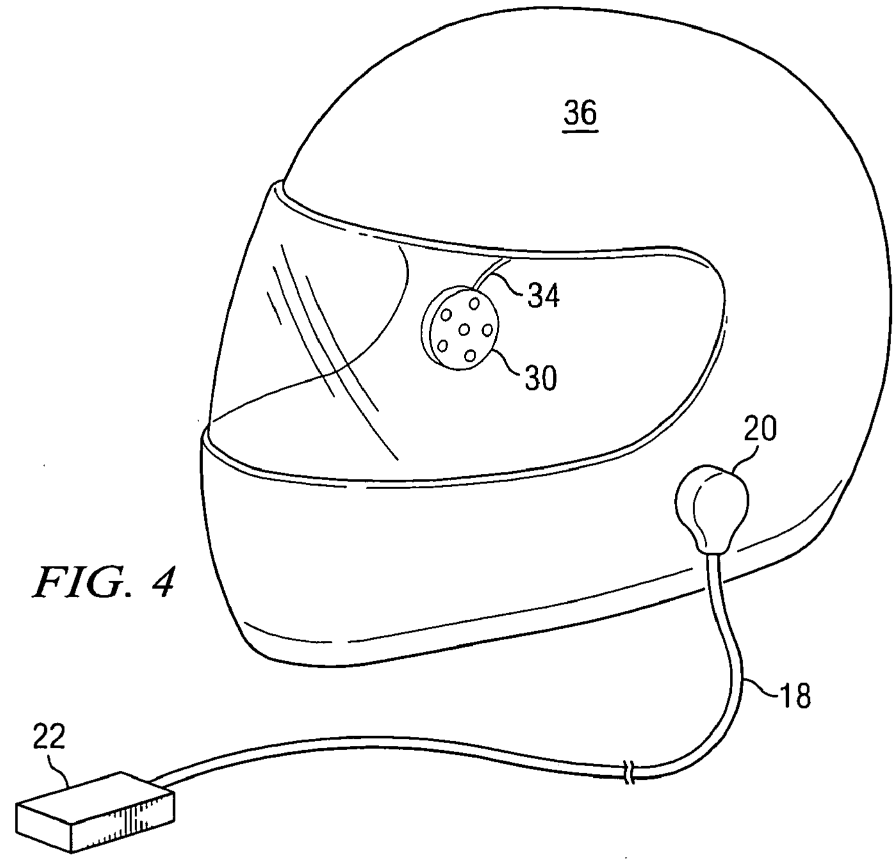
FIG. 4 is an external view of a helmet with an attached clampless headset mounting assembly of FIG. 1 according to the invention.

FIG. 4 is an external view of a helmet 36 with an attached clampless headset mounting assembly 10. An external cable 18, associated connector 20, and external electronic communications device 22 are illustrated. Additionally, a speaker 30 and its associated wire 34 are shown placed along the internal surface of the helmet.

Figure 5:
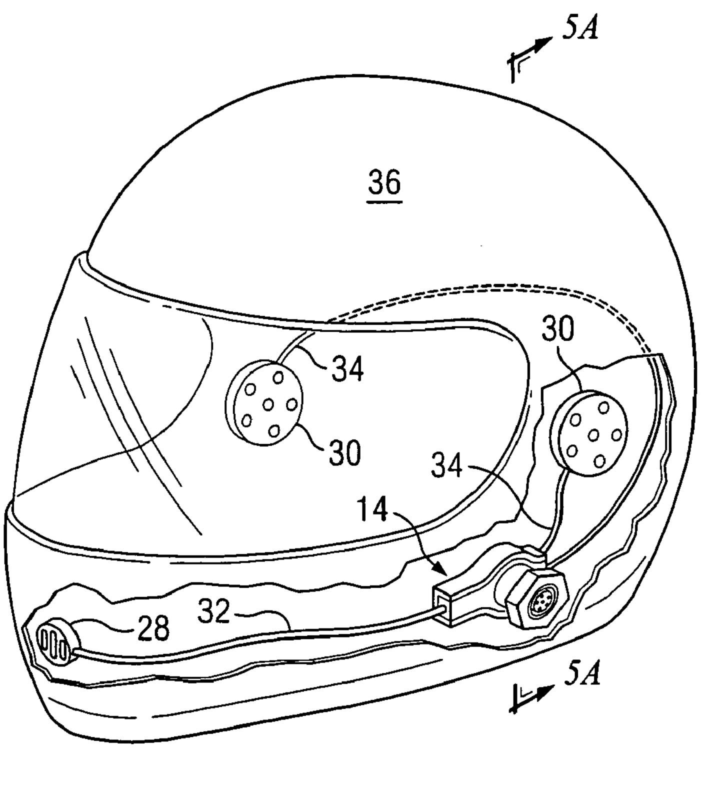
FIG. 5 is a cut-away illustration of the helmet with full coverage style helmet with the attached clampless headset mounting assembly of FIG. 4 according to the invention.
Figure 5A:
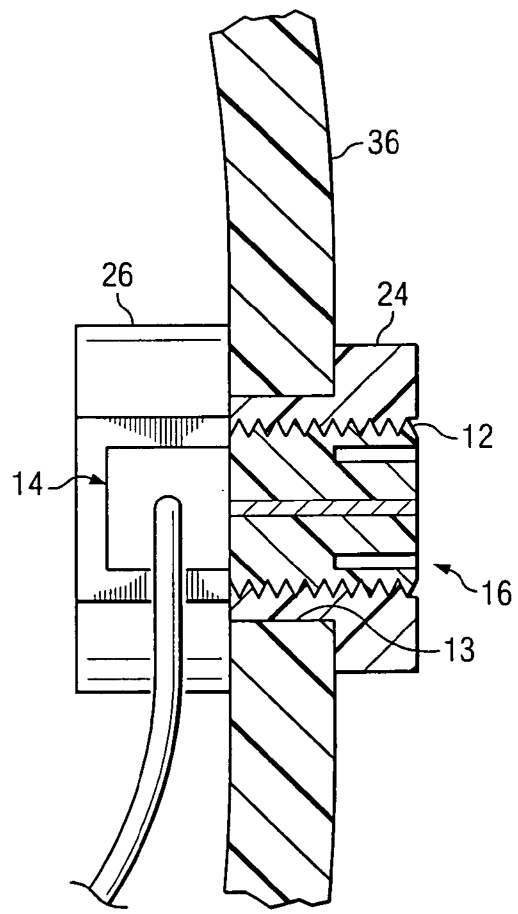
FIG. 5A is a partial cross section of the helmet of FIG. 5, taken along lines 5A1—5A1 and 5A2—5A2 thereof.

FIG. 5 is a cut-away illustration of the helmet 36 with an attached clampless headset mounting assembly 10. The base 14, microphone 28, and microphone assembly 32 are illustrating residing inside the helmet 36. In this embodiment, the microphone assembly 32 is comprised of two or more wires connecting the base 14 to a stationary microphone 28 attached to the interior of the front of the helmet 36.

Figure 6:
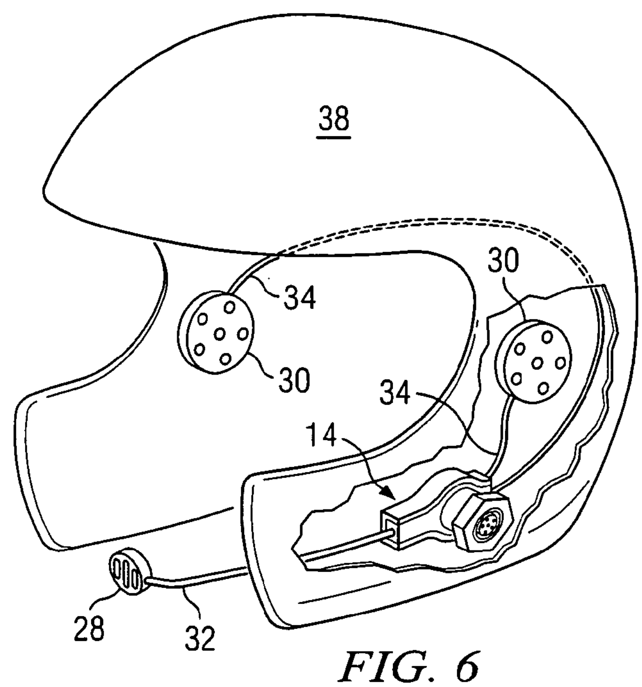
FIG. 6 is a cut-away illustration of an open faced style helmet with attached clampless headset mounting assembly of FIG. 4 according to the invention.

FIG. 6 is a cut-away illustration of an open face helmet 38 with an attached clampless headset mounting assembly 10. The base 14, microphone 28, and microphone assembly 32 are illustrated. In this embodiment, the microphone assembly 32 is comprised of a boom with inherent electrical pathways which can be adjusted to position the microphone 28 as desired by the helmet wearer.

A wearer of a helmet may wish to connect a clampless mounting assembly to one of a plurality of different types of external electronic communications devices 22. These different types of devices may require different combinations of electrical conductors through which they send and receive electrical signals. In order to accommodate a large range of types of communications devices, the numerous electrical conductors passing through the post 12 can be configured into a plurality of different subsets of conductors. Only the conductors necessary to communicate with an attached external electronic communications device 22 are used at any given time. Attaching a different external electronic communications device 22 may result in a different set of electrical conductors being selected. Electrical conductors necessary to communicate with an attached external electronic communications device 22 are referred to as active conductors. Unused electrical conductors are referred to as passive or unused conductors.

In order for the speakers 30 and microphones 28 of the headset assembly to communicate properly with the electrical conductors passing through the post 12, electrical signals must be switched. The means for selecting active conductors is shown in patent application Ser. No. 09/441,392, filed Nov. 16, 1999 ("SWITCHING MEANS"). The SWITCHING MEANS is used to switch electrical signals between active conductors passing through the post 12 and the wires attached to the speakers 30 and microphones 28. Additionally, use of the SWITCHING MEANS may allow different types of microphones 28 or speakers 30 to be used.

The terms and expressions which have been employed in the foregoing specification are used therein as terms of description and not of limitation, and there is no intention, in the use of such terms and expressions, to exclude equivalents of the features shown and described or portions thereof, if being recognized that the scope of the invention is defined and limited only by the claims which follow.

We claim:

1. A headset mounting assembly for use with a helmet, comprising:

a mounting post for inserting through an aperture in the helmet, the mounting post having multiple alternative electrical pass-through conductors that extend there through;

a base disposed at an interior end of the mounting post for supporting the mounting post inside the helmet; and a first multiple-conductor connector disposed at an exterior end of the mounting post for matably accepting a second multiple-conductor connector for connecting multiple external conductors to respective pass-through conductors, the multiple alternative electrical pass-through conductors enabling the assembly to adapt to different types of audio systems in response to mating with the second multiple-conductor connector.

2. The headset mounting assembly of claim 1, further comprising a retainer for engaging the mounting post to secure the mounting assembly to the helmet.

3. The headset mounting assembly of claim 2, wherein the retainer for engaging the mounting post comprises a threaded fastener, the mounting post having external threads and the fastener having internal threads for engaging the external threads of the mounting post.

4. The headset mounting assembly of claim 2, wherein the pass-through electrical conductors are connected within the helmet to at least one audio transducer.

5. The headset mounting assembly of claim 4, wherein at least one audio transducer comprises a speaker.

6. The headset mounting assembly of claim 4, wherein at least one audio transducer comprises a microphone.

7. The headset mounting assembly of claim 6, wherein at least one audio transducer comprises a speaker.

8. The headset mounting assembly of claim 6, wherein said microphone is disposed on a microphone boom attached to and supported by the base.

9. The headset mounting assembly of claim 8, wherein said multiple alternative electrical pass-through conductors are configured so that they may be attached to one or more of a variety of external electronic devices.

10. The headset mounting assembly of claim 9, further comprising a cable having disposed at a first end thereof said second multiple-conductor connector for mating with the first multiple-conductor connector and, at a second end thereof, a third multiple-conductor connector for connection to the electronic devices.

11. The headset mounting assembly of claim 9, further comprising an adapter cable having at a first end thereof said second multiple-conductor connector for mating with the first multiple-conductor connector and, at a second end thereof, a third multiple-conductor connector for connection to a second cable which is, in turn, connected to said electronic device.

12. The headset mounting assembly of claim 9, wherein said variety of external electronic devices comprises any one of a radio, CD player, tape player, or wireless telephone.

13. The headset mounting assembly of claim 8, wherein said multiple alternative electrical pass-through conductors are configured so that they may be used with one or more of a variety of audio transducers within the helmet.

14. The headset mounting assembly of claim 8, wherein said said audio transducer comprises a microphone disposed on the boom proximate to an end thereof opposite the base.

15. The headset mounting assembly of claim 7, wherein said audio transducer comprises a microphone disposed on an interior of the front of a full coverage style helmet.

16. The headset mounting assembly of claim 1, further comprising a cheek cushion which covers said base.

17. The headset mounting assembly of claim 3, wherein said retainer completely encapsulates said threaded exterior portion of said mounting post to protect said mounting post threads.

18. A method of providing electrical connections to audio transducers within a helmet, comprising:

inserting through an aperture in the helmet a mounting post having multiple alternative electrical pass-through conductors having a plurality of alternative sets extending there through, the mounting post having a base disposed at an interior end thereof;

engaging the mounting post by placing a retainer on an exterior end of said mounting post;

connecting one or more said audio transducers to the pass-through conductors on the inside of the helmet; and connecting one or more external electronic communications devices to the pass-through conductors on the outside of the helmet so as to select from among the alternative sets of the multiple alternative electrical pass-through conductors and thereby adapt to one or more electronic communications devices.

19. The method of claim 18 wherein said retainer is a threaded fastener, and further wherein said mounting post comprises external threads and the fastener comprises internal threads for engaging the external threads of the mounting post.

20. The method of claim 18 wherein at least one audio transducer comprises a speaker.

21. The method of claim 18, wherein at least one audio transducer comprises a microphone.

22. The method of claim 21, wherein at least one audio transducer comprises a speaker.

23. The method of claim 22, further comprising attaching said microphone to a microphone boom, and attaching said microphone boom to said base.

24. The method of claim 22, further comprising configuring the multiple alternative electrical pass-through conductors so that they may be attached to one or more of a variety of external electronic devices.

25. The method of claim 24, wherein said variety of external electronic communications devices comprises any one of a radio, CD player, tape player, or wireless telephone.

26. The method of claim 22, further comprising configuring said multiple alternative electrical pass-through conductors so that they may be attached to one or more of a variety of audio transducers within the helmet.

27. The method of claim 23, further comprising disposing said audio transducer on said boom on a proximate end thereof opposite the base.

28. The method of claim 18, further comprising covering said base with a cheek cushion.

29. The method of claim 19, further comprising completely encapsulating said threaded exterior portion of said mounting post with said retainer to protect said mounting post threads.

30. The method of claim 22, further comprising attaching said microphone to an anterior side of the front of a full coverage style helmet.

* * * * *